Patented Nov. 12, 1929

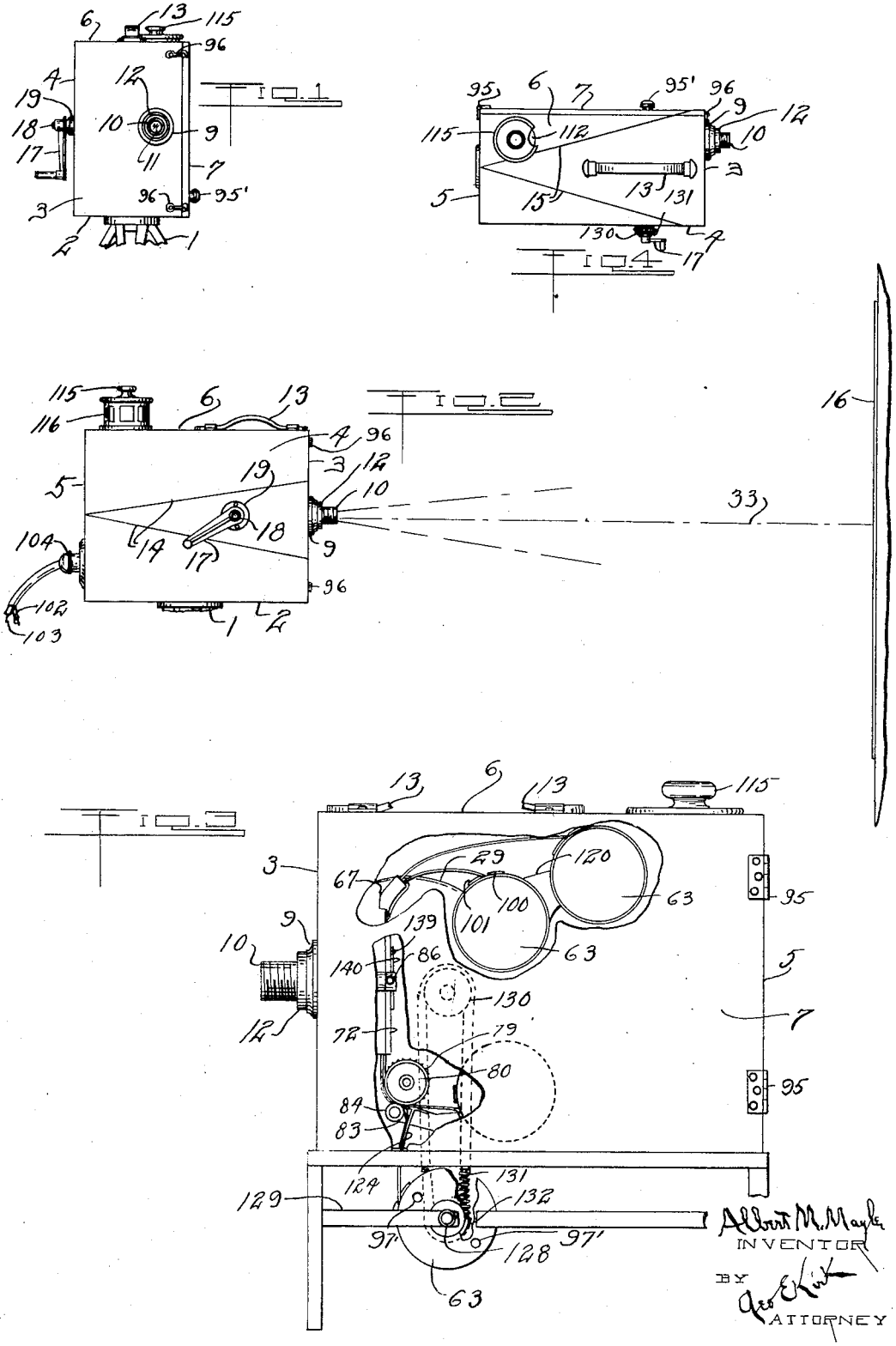

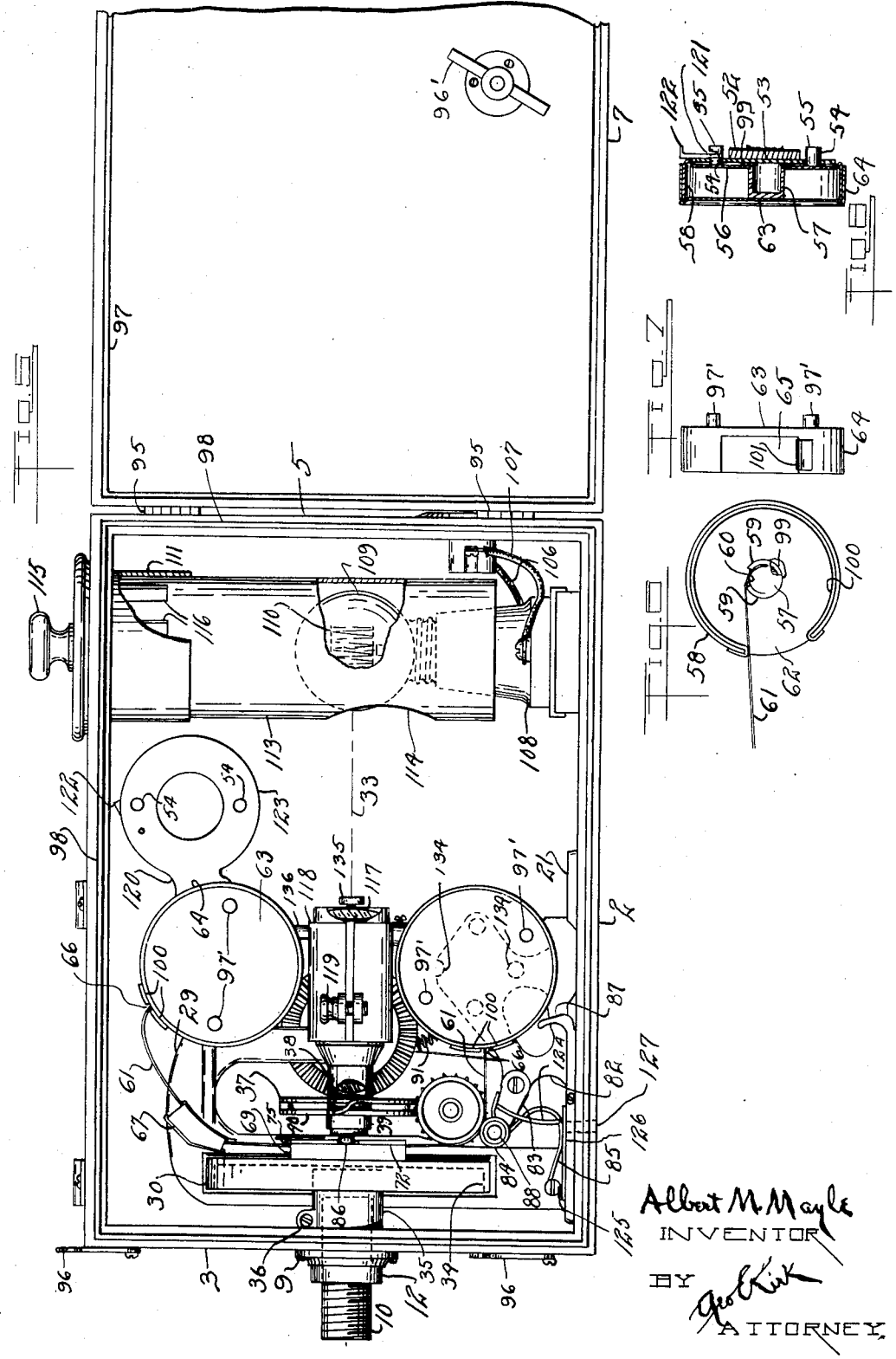

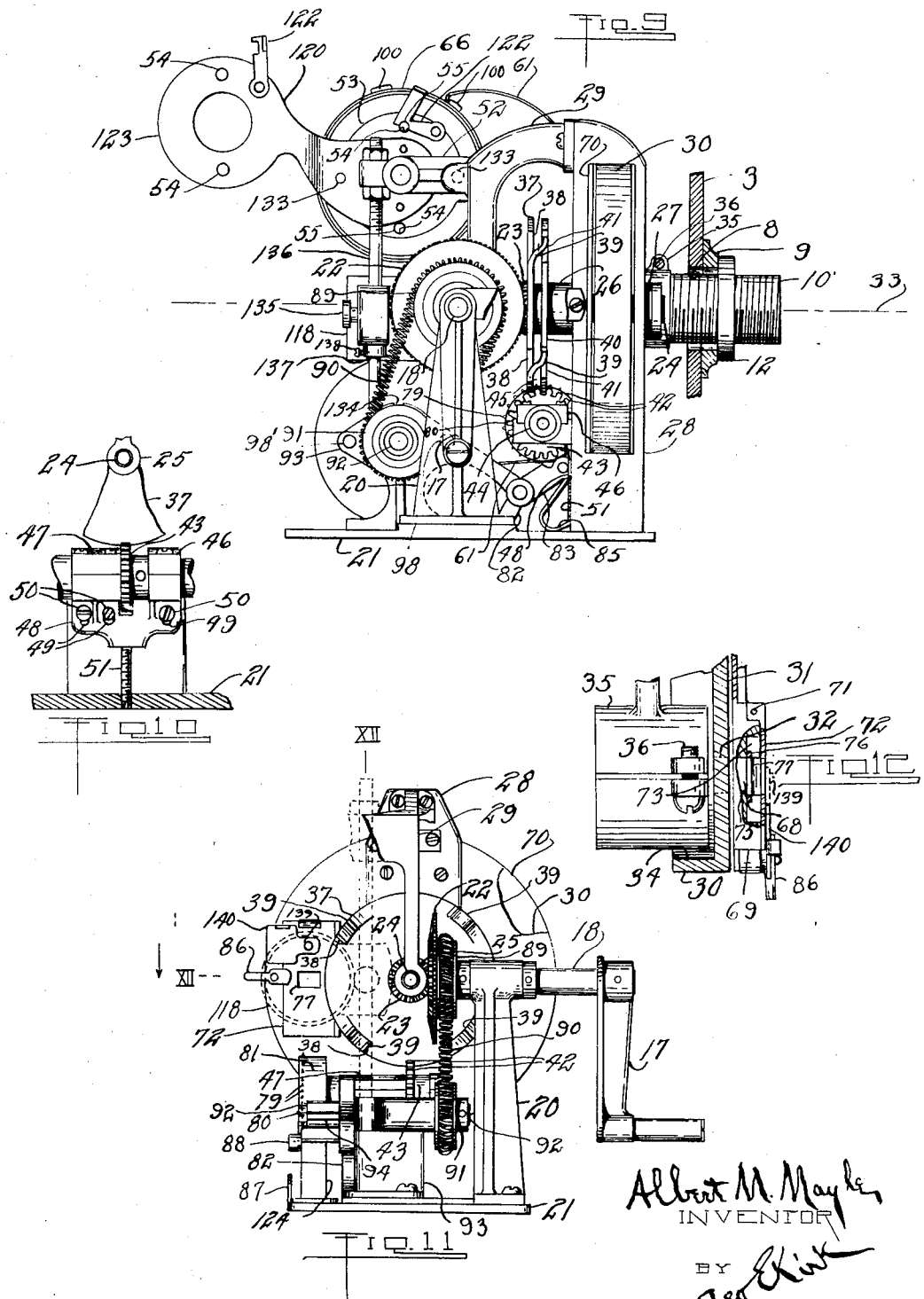

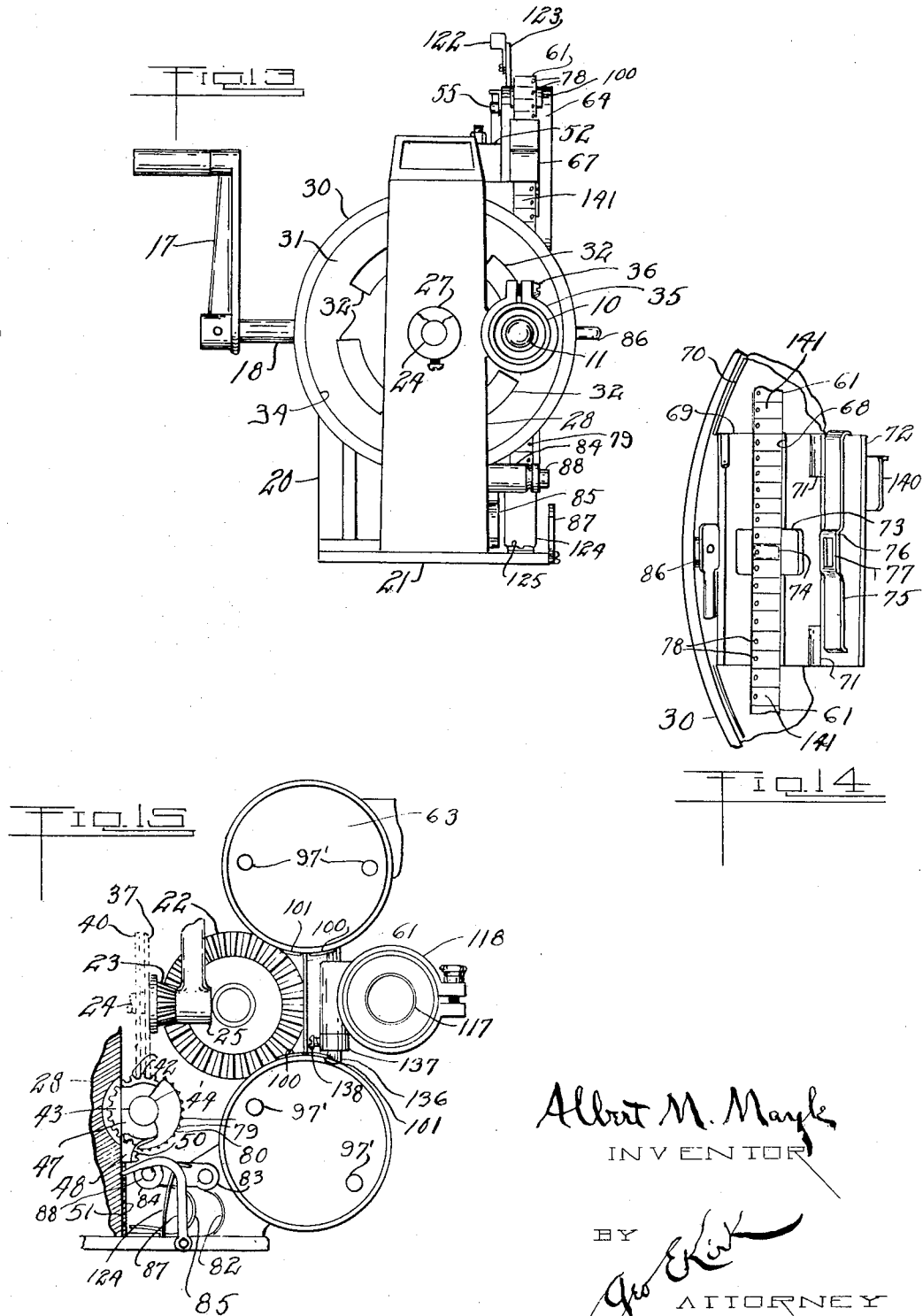

1,735,468

UNITED STATES PATENT OFFICE

ALBERT M. MAYLE, OF TOLEDO, OHIO

MOTION-PICTURE APPARATUS

Application filed October 18, 1923. Serial No. 669,238.

This invention relates to record forming and handling apparatus.

This inventon has utility when incorporated in motion picture cameras, especially of the strip film type.

Referring to the drawings:—

Fig. 1 is a fragmentary view of an embodiment of the invention in a camera, the view being looking into the camera with the camera in taking position;

Fig. 2 is a side elevation of the camera in view projecting position, parts being broken away;

Fig. 3 is a fragmentary view of the camera of Fig. 1 in printing position;

Fig. 4 is a plan view of the camera, Fig. 3.;

Fig. 5 is a view of the camera as assembled for projection, the camera housing having its side door open, parts being broken away;

Fig. 6 is a detail view of a receiving roll inner section in side elevation;

Fig. 7 is an edge view of the housing or companion section to the section of Fig. 6;

Fig. 8 is a vertical sectional view of a roll section and its mounting;

Fig. 9 is a view of the mechanism from the opposite side of the showing in Fig. 5;

Fig. 10 is a detail view of the adjustable bearing for the intermittently driven shaft;

Fig. 11 is a fragmentary view of the mechanism from the lamp side thereof in Fig. 5;

Fig. 12 is a section on the line XII—XII, Fig. 11;

Fig. 13 is a view of the mechanism from the side remote from the lamp;

Fig. 14 is a detail view on an enlarged scale of the film guide with the door of said guide open; and Fig. 15 is a fragmentary view of the mechanism having its rolls assembled for rewinding operation.

Tripod 1 (Fig. 1) is shown as being anchored with base 2 of a housing having lens end 3, crank side 4, socket side 5, top 6 and door 7. The lens side 3 has opening 8 (Fig. 9) therethrough about which is mounted flange 9 as a guide for threaded barrel 10 in which is mounted taking and projecting lens 11. The clearance of this threaded barrel 10 as to the opening 8 is made light tight by nut 12 being run up on the barrel 10 in adjusted position against the flange 9. This main housing may be carried from handle 13 on its top side 6. In taking or projecting use of this camera, a finder or general guide is provided in the form of diverging lines 14 on the side 4, and diverging lines 15 on the side 6. These are suggestive to the operator of the camera as to field 16 to be covered by the lens 11.

Crank 17 is mounted on shaft 18 protruding through flange 19 from within the main housing. This shaft 18 is carried by bracket 20 on the base 21. This shaft 18 on the side of the bracket 20 (Fig. 11) remote from the crank 17 carries bevel gear 22 in mesh with bevel pinion 23 on shaft 24 having bearings 25, 26, 27 (Fig. 9). The bearings 26, 27, are carried by a main bracket 28 rising from and a part of the base 21. The bearing 25 is carried by bracket 29 overhanging from the upper portion of the bracket 28. In either power or manual operation of this device, the shaft 18 is to run continuously as is also this shaft 24.

This shaft 24 carries fly wheel 30 having web portion 31 (Fig. 13) thereof provided with openings 32 therein serving as a shutter in the rotation of this fly wheel 30 as intercepting light line 33 as determined by the lens 11. This fly wheel 30 has overhang or shroud portion 34 into which the lens mounting barrel 10 may extend. This barrel 10 is primarily mounted by clamp 35 (Fig. 12), the gripping action of which is adjusted by screw 36. The barrel 10 accordingly may be brought into a desired focusing proximity to the web 31 of this fly wheel shutter and within the shroud 34.

This shaft 24 adjacent the bevel pinion 23 carries disc 37 having openings 38 from which offsets 39 extend away from the plane of the pinion 23 toward opposing disc 40 having openings 41 which approximately register with the openings 38, (Figs. 5, 9, 11). Accordingly in clockwise rotation of the crank 17 the disc 37 swings downward to have the offsets 39 engage teeth 42 in gear 43 on shaft 44 for rotating such gear wheel upper portion toward the bracket 28 to pass out one tooth at a time through the opening 41 as a succeeding tooth 42 enters the adjacent opening 38 to be held in groove 45 against any rotative movement during the continuation of the rotation of this pair of discs 37, 40, until the next offset 39 is reached. This means that the shaft 44 is given a step by step or intermittent driving operation from the continuously rotating shafts 18, 24. This shaft 44 is mounted in bearings 46, 47, on opposite sides of the gear 43 (Fig. 10). These bearings 46, 47, are mounted on bracket 48 having slots 49 therein with which may coact screws 50 in anchoring the bracket 48 with the bracket 28. Adjusting screw 51 may be operated upon loosening the screws 50 so that the bracket 48 may be adjusted toward or from the shaft 24 thus to vary the meshing relation between the four toothed driving wheel and the intermittent follower pinion of this gear connection.

From the bracket 29 extends auxiliary bracket 52 (Fig. 9) carrying disc 53 having a pair of diametrically disposed openings 54 into which may loosely engage pins 55 from disc 56 carrying hub 57 and fragmentary rim 58. Thus hub 57 has struck-up portions 59 to form seat 60 into which may be thrust the end of strip film 61 (Fig. 6) to be drawn over the struck-up portion 59 and thus frictionally locked against pulling off this hub 57 as wound thereon. This strip material 61 as wound on the hub 57 against the disc 56 may have its free end pass out opening 62. This supply roll receiving section has its roll housing completed by disc 63 (Fig. 7) in opposing relation to the disc 56 and having its fragmentary rim 64 telescoping over the rim 58. This fragmentary rim section 64 provides opening 65 which may be moved as to the opening 62 for varying the size of delivery way 66 (Fig. 5) from which supply of strip material 61 may pass. Accordingly by relatively angularly shifting the roll housing sections, the size of the delivery opening 66 may be varied. In the instance of a film which has not been exposed or developed, it is good practice to keep this opening 66 at a minimum to thereby more effectively protect the strip material from being light struck. This strip material in passing from this supply roll mounting may be directed by velvet lined chute 67 (Figs. 3, 5,) to way 68 in guide plate 69 (Fig. 14) as a jamb carried by the bracket 28 against shield 70 adjacent fly wheel 30 and on the side thereof remote from the lens 11. This shield 70 is fixed with the bracket 28 and in close proximity to the fly wheel 30 as a light leakage precluding means. This accordingly minimizes any occasion for light disturbance from the shutter openings 32. This door jamb 69 is provided with hinges 71 mounting door 72. The way 68 intermediate its length has enlarged portion 73 centrally of which is window or primary frame 74. The door 72 is provided with spring 75 extending along the way 68 and provided with cheeks 76 in the region of the way enlargement 73. This spring in the region of the cheeks 76 has framing opening 77 approximating the primary frame 74. The strip material 61 as passing through the guide 67 carried by the bracket 28 extends into the way 68 to be yieldably guided against vibration into position at the frame 74. This strip material is shown as having an opening 78 for each frame station or view position thereof. This film 61 as passing from the way 68 has the openings 78 therein entered by pins or teeth 79 of wheel 80 on the shaft 44. These openings 78 are along one margin of this strip film 61. The view portion of the film as extending from these openings 78 is herein shown as riding upon cylindrical portion 81 of this gear wheel 80, (Fig. 11).

From the base 21 there rises bracket 82 (Figs. 5, 13, 15) carrying swingable arm 83 terminally carrying the grooved friction roll 84, the groove of which registers with the teeth 79 of the gear 80, while the friction roll hereof, which may be of rubber, is yieldably held by leaf spring 85 for urging the film material into snug contacting relation with the teeth 79 and the cylindrical portion 81 of the gear wheel 80. Accordingly in the intermittent operation of this shaft 44 there is step by step pulling of this strip material in drawing the strip material through the guideway 68 and past the door openings 74, 77, in the light line 33.

To feed this strip material from the supply roll the door 72 is opened by releasing the latch 86. By hook 87 engaging boss 88 at the roller 84, this roller 84 is pulled against the resistance of the spring 85 to clear the gear wheel 80 so that the strip material 61 may be placed on the teeth of this gear wheel 80 with an end of this strip material extending through opening 66 as adjusted between the rims 64, 58, of the receiving roll sections and brought into slots 60 under a raised portion 59.

The shaft 18 adjacent the bevel gear 22 has pulley 89 (Fig. 11) over which passes extensible belt 90 herein shown as of a helical spring, passing about pulley 91 on shaft 92 carried by bracket 93 mounted on the frame 21. This shaft 92 extends from the bracket 93 and has a key 94 engaging hub 57 of strip film receiving roll section. As the crank 17 is turned continuously, the extensible belt 90 rotates the shaft 92 to place a tension thereon for yieldably drawing or winding the strip film as delivered from the gear wheel 80. Accordingly there is a take-up for strip film continuously as passing from the gear wheel 80. At once a wind of this strip film is had on the roll receiving hub, the hook 87 may be removed to allow the roller 84 to swing upward and hold the strip film into engagement with this gear wheel 80. The latch 86 may be swung into holding position to lock the door 72 closed. In the instance that this manipulation is done for taking, the strip of film 61 as initially fed through from the supply roll, is light struck. The door 7 of the main housing may be swung on its hinges 95 (Fig. 5) into closed position and there locked by hooks 96. This door 7 has groove 97 into which enters rib 98 as the door is closed for effectively shutting out light leakage into the mechanism.

The taking operation may be handled in the usual manner by locating the object to be viewed, say within the range of the finder lines 14 on the side 4 and 15 on the side 6 of the main housing and centrally of such range. The crank 17 should then be operated say at a speed of not less than 80 R. P. M. when the speed reduction between the gears 22, 23, are 3 to 1, and there are four steps to a rotation of the shaft 24.

When the run of the film is completed the stock of strip material is all off the supply roll and has passed into the receiving roll housing. In a roll of approximately 2½ inches in diameter there may be placed approximately 75 feet of film, which with views $\frac{3}{16}''$ high and ¼'' wide should give a display period or taking period running from seven to ten minutes.

As the film which has been exposed is all wound on the receiving roll, handle 95' (Fig. 1) as protruding from the side 7 may be operated. This handle 95' as extending from the outside of the box to the inside has cross-arm 96', (Fig. 5) which upon rotation may engage pins 97' on the outer housing member of the receiving roll, for rotating this housing section and bringing the opening 65 thereof out of register with the opening 62 of the companion housing section. This means that the adjustable opening 66 between the roll housing sections is closed. When this closing of the film in the roll receiving housing has been accomplished, say by a 50° or 60° turn of the handle 95', the door 7 may be opened and this receiving roll removed from its mounting by direct withdrawal outward. The housing and arms 96' normally hold this receiving roll from working off the shaft 92 and also keeps the pins 55 from coming out of the openings 98' in the bracket 93. The hub section 57 (Fig. 8) is provided with flanges 99 so that this hub section is free to rotate relatively to the disc section 56. The rim 58 (Fig. 6) is shown as having lining 100 of velvet to reduce the friction of the loosening up film as unwinding from the supply roll in its withdrawal therefrom by the intermittent film drawing device. The opposing or companion rim section 64 (Fig. 7) has a velvet faced lip 101 as an anti-friction guide so that the delivery opening or supply opening 66 may have both portions thereof faced with this anti-friction velvet thereby tending to lengthen the life of the film.

After the picture has been taken and the film developed such film may be projected by changing the film into the supply roll and feeding down to the receiving roll in a manner similar to that for handling the undeveloped film. In projecting, of course, the source of light is not exterior, but from within. Accordingly there is provided in this main housing a source of light. Electric supply lines 102, 103, (Fig. 2) may extend to plug 104 in side 5 of the housing there to be connected by lines 106, 107, (Fig. 5) to socket 108, mounting lamp 109 to effect illumination of filament 110 of said lamp 109 in light line 33. Above this lamp is fixed sleeve 111 about opening 112 (Fig. 4) in top 6 of the main housing. Snugly fitting and frictionally held in this guide sleeve 111 is shield 113 (Fig. 5) having opening 114 from the lamp 109 in the region of the light line 33 when this sleeve 113 is in ventilating position. The lamp 110 in giving off heat may raise the temperature in this housing unreasonably and simple provision for the relief thereof is provided herein by shifting this sleeve 113 upward. This is effected by pulling handle 115 which brings openings 116 above the opening 112, so that heat from the lamp 109 may pass up this chimney 113 and out openings 116, and thereby not be dissipated in the vicinity of the film 61 to endanger such. With this light 110 energized and the chimney or sleeve 113 pulled upward to have the opening 114 centrally of the light line 33 condenser lens 117 carried by clamp 118 may be adjusted by screw 119 and projection occur as a motion picture by rotation of the crank 17 for throwing objects on the screen 16.

This compact device may be further used for producing positives from negatives or copying films as may be found desirable. To this end supplemental bracket 120 is carried from the bracket 52. The pins 55 on the discs 56 may be provided with grooves 121 (Fig. 8) to be engaged by latch 122 (Fig. 9). This holds the supply roll housing against removal and still allows some play or wobble. This is a feature desirable against binding and possible tearing of this strip film. The supplementary bracket 120 (Figs. 5, 9) carries a disc 123 similar to the disc 53. This disc 123 has openings 54 for receiving pins 55, and has latch 122 for loosely mounting a supply roll housing. The film which is to be printed may be in the housing as carried by the disc 53 while the positive or record may be in the housing as carried by the disc 123. These two ribbons of strip material are each fed through the guide 67 and through the guideway 68, as well as over the teeth 79 as held by the roller 84. As passing from this roller 84 the film being printed is delivered into the receiving roll housing as carried on the shaft 92 and the bracket 93. A yieldable guide 124 (Figs. 3, 15) adjacent the wheel 84 separates the record from the film and directs such record downwardly. Screw 125 has been loosened to shift plate 126 clear of opening 127 so that this record may pass through this opening 127 to roll receiving housing mounted on shaft 128 carried by bracket 129 upon which the main housing is resting. The shaft 18 adjacent the crank 17 is provided with pulley 130 from which extends extensible belt 131 of helical spring about pulley 132 on the shaft 128 for effecting winding by placing a tension on the record film as supplied into this receiving roll housing on this shaft 128. Accordingly the winding of the pair of receiving rolls, one for the film and the other for the record, is simultaneous. This printing embodiment is an assembly which is made readily as it is desired to have such printing take place.

As films or records have been used and are on the receiving roll and in such receiving roll housings they are wound reversely to position desirable for projection to effect reassembly thereof and in condition for projection it is necessary to rewind. This device is readily adaptable to this purpose. The disc 53 besides the openings 54 has at 90° therefrom similar openings 133 (Fig. 9). This permits shifting of the disc 56 to bring its opening 62 facing the shaft 92. The companion section may be telescoped therewith to determine the size of the supply opening 66 as directed toward the shaft 92. Bracket 93 has, in addition to the openings 98', a second pair of openings 134 permitting mounting of the receiving disc roll section 56 to have its openings 62 face toward the opening of the supply roll housing directly thereover (Fig. 15). The clamp 118 housing the condenser lens 117 is mounted by set screw 135 (Figs. 9, 15) on stem 136 between the bearing 93 and the bearing 52. On this stem 136 is collar 137 fixed by set screw 138. This collar 137 accordingly determines the adjustment of the condenser into the light line 33. Loosening of the set screw 135 permits swinging of the clamp 118 and its condenser 117 therein away from projecting position in the light line 33 to give clear way between the upper supply disc as carried by the bracket 52 so that a reversely wound film on such bracket 52 may pass directly downward into a roll receiving housing on the shaft 92 there to be wound. This rewinding by rotating the shaft continuously withdraws the strip film directly from the supply roll independently of passing the intermittent driving mechanism. After the film is rewound into the lower receiving roll housing and if projection is to occur, the condenser 117 again is brought into light line position. If this rewinding be in connection with printing, the shifting of the condenser is unnecessary.

In the printing operation the light supply is through the lens 11, and the film as riding in the way 68 is adjacent the spring 75, while the record is adjacent the jamb. Notwithstanding there is the frame opening or window 77 in the door 72, an opaque backing for the film as being printed is provided in the light line 33. The door 72 is provided with pin 139 for opaque plate 140 which, with the door opened to clear the latch 86, may be swung downward to close the door 77 from the position shown in Fig. 11. In normal taking and projecting operation this closure 140 is in position shown in Fig. 11 while in printing operation such is swung down into closed position shown in Fig. 3.

The disclosure herein is of a compact simple device, having a full range of utility incidental to motion picture operations. Furthermore it has a capacity with these minute view regions 141 for a time interval of projection, and even up to a size of 4' x 5' with a clearness in detail giving the apparatus value as a home instrument as well as for industrial purposes. It is of such small size that engineers, traveling salesmen, or investigators, may have this device as a ready means for recording or displaying occurrences in connection with their work.

What is claimed and it is desired to secure by Letters Patent is:—

1. A motion picture machine embodying a housing having a light line therein, a continuously rotating driving shaft axially parallel to said light line, an intermittently rotating driven shaft, gear connection therebetween, means for adjusting the shafts for varying the mesh of said gear connection, and a rotary interceptor for said light line actuable from one of said shafts and coaxial with the driving shaft.

2. A motion picture machine embodying a supply roll, a receiving roll, laterally spaced from and parallel to the supply roll, a condenser between said rolls for defining a light line, a main housing for the condenser and rolls, secondary housing means for the rolls having strip material directing guide openings, mountings adjusting said guide openings into the plane of the axes of the rolls, there being a mounting for the condenser to permit shifting thereof out of strip material way position between said rolls, and continuous driving means for the receiving roll for effecting continuous withdrawal of material from the supply roll.

3. A motion picture machine embodying a supply roll, a receiving roll, said rolls being laterally spaced from each other and axially parallel, a condenser lens directly therebetween determining a light line, a frame, a main housing for the rolls, said condenser being swingably mounted on the frame to shift in the housing out of said light line and clear between said rolls, and driving means for a receiving roll for continuously withdrawing material from the supply roll across said light line.

4. A motion picture machine embodying a main housing, supply and receiving rolls in said housing, said rolls being laterally spaced from each other and axially parallel, mechanism for winding a strip film from the supply roll upon the receiving roll, a roll housing provided with a closable guide opening to the receiving roll for a film to be delivered to the receiving roll, and a handle exterior of the main housing operable to close said opening and having actuating means therefrom effective for closing said guide opening, said handle as operable additionally coacting for driving the receiving roll.

5. A camera embodying a film receiving roll comprising a first hub disc and fragmentary rim section, a second opposing disc and fragmentary rim section telescoping with said first rim section, said rim sections being normally angularly disposed to provide a film entrance opening, said second section having a pair of pins, a housing for the camera, and a handle exterior of the housing having means coacting on handle rotation to engage said pins for effecting rotation of the second rim section as to first rim section in closing said opening.

6. A camera embodying a strip material supply roll, a strip material receiving roll, a toothed wheel drive between the rolls for engaging strip material from the supply roll and withdrawing such material therefrom for delivery to the receiving roll, a guide for holding the strip material in engagement with the toothed wheel, an arm mounting said guide, a spring normally urging the guide against the toothed wheel, and hook means for shifting the guide against the resistance of the spring to clear the guide from the wheel in providing clearance for ready feeding of strip material terminus past the guide, said spring coacting upon release of the hook means to return the guide to engage the material.

7. A motion picture camera embodying a lens determining light line, a guide for a film across said light line including a way, a rotary shutter, a non-rotary door having a frame opening swingable to register with said light line, a non-rotary closure for the door opening in addition to said shutter, a minor housing unit for the guide door and closure, and a main camera housing for the minor housing and lens.

8. A motion picture machine embodying an intermittent drive device, a shutter providing fly wheel, a continuous drive for the fly wheel and device, said fly wheel being provided with a shroud as a shield, a lens, and means mounting the lens within the overhang of such shroud.

9. A motion picture machine embodying an intermittent drive device, a shutter providing fly wheel, a continuous drive for the fly wheel and device, said fly wheel being provide with a shroud as a light shield, a lens mounting extending toward the shutter within said shroud, and a film guide on the opposite side of the shutter from the mounting.

10. A motion picture machine embodying a housing, a light source therein, a condenser determining a light line from said source, said housing having an opening therethrough above the light source, and a telescopic ventilator at said opening having a section withdrawable from the housing for rendering the ventilator operable.

11. A motion picture machine embodying a housing, a lamp therein, above which the housing has an opening, and at said opening a closable ventilator for the lamp including a cap movable outward from the housing to render the ventilator operable.

In witness whereof I affix my signature.

ALBERT M. MAYLE.